United States Patent
Reed et al.

(10) Patent No.: US 10,762,240 B2
(45) Date of Patent: Sep. 1, 2020

(54) ANONYMIZING A FILE FOR DIAGNOSIS

(71) Applicant: International Business Machines Corporation, Armonk, NY (US)

(72) Inventors: David C. Reed, Tucson, AZ (US); Max D. Smith, Tucson, AZ (US); Philip R. Chauvet, Tucson, AZ (US); Franklin E. McCune, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/108,606

(22) Filed: Aug. 22, 2018

(65) Prior Publication Data

US 2020/0065520 A1    Feb. 27, 2020

(51) Int. Cl.
*G06F 17/00*        (2019.01)
*G06F 21/62*        (2013.01)
*G06F 7/58*         (2006.01)
*G06F 16/11*        (2019.01)
*G06F 16/901*       (2019.01)

(52) U.S. Cl.
CPC .......... *G06F 21/6254* (2013.01); *G06F 7/588* (2013.01); *G06F 16/122* (2019.01); *G06F 16/901* (2019.01)

(58) Field of Classification Search
None
See application file for complete search history.

(56) References Cited

U.S. PATENT DOCUMENTS

| | | | |
|---|---|---|---|
| 5,930,291 A | 7/1999 | Hines | |
| 7,512,693 B2 | 3/2009 | Hollingsworth | |
| 8,234,282 B2 | 7/2012 | Retzlaff, II et al. | |
| 9,195,853 B2 | 11/2015 | Fox et al. | |
| 9,910,902 B1 * | 3/2018 | Kramer | G06F 16/2272 |
| 2003/0220927 A1 * | 11/2003 | Iverson | G06F 21/6254 |
| 2010/0082652 A1 | 4/2010 | Jones et al. | |
| 2011/0066606 A1 | 3/2011 | Fox et al. | |
| 2011/0239113 A1 | 9/2011 | Hung et al. | |
| 2014/0136941 A1 | 5/2014 | Avrahami et al. | |
| 2019/0205566 A1 * | 7/2019 | Shelton, IV | G06F 21/6254 |

* cited by examiner

*Primary Examiner* — Anhtai V Tran
(74) *Attorney, Agent, or Firm* — Kunzler Bean & Adamson

(57) ABSTRACT

Apparatuses, methods, and computer program products are provided for anonymizing a data set having an index component and a data component. In certain embodiments, the apparatuses, methods and computer program products make a copy of the data set, removes personal information from the data component, modifies an index component key value with a random value, modifies a data component key value with the same random value, and maintains a data set structure of the index component and the data component.

20 Claims, 8 Drawing Sheets

ANONYMIZING A FILE FOR DIAGNOSIS

FIELD

The subject matter disclosed herein relates to data sets having an index component and a data component, and more particularly relates to anonymizing both the index component and the data component.

BACKGROUND

In the z/OS operating system, the Virtual Storage Access Method (VSAM) describes an access method as well as various structures for organizing data. Some of these various structures can contain key-sequenced VSAM data sets. For VSAM data sets that are indexed by keys, the z/OS operating system provides both an index and a data component. The index contains information to locate and access information of the data component in storage devices. The data component often contains information that is considered personal and/or confidential. Frequently, the index is keyed using the personal or confidential information from the data component because a unique key is necessary to index the information in the data component.

If a data component becomes corrupted (e.g., a key in the index does not properly identify a location of a corresponding record in the data component), both the index and the data component must be analyzed to determine the source of the corruption. However, data privacy is becoming increasingly important, and service providers are ever more worried about the personal/confidential information of their customers becoming public, and are therefore reluctant to turn over the VSAM data set to be analyzed by a third party. Additionally, government regulations may restrict access and data retention for data sets that contain personal/confidential information.

BRIEF SUMMARY

A method for anonymizing a data set having an index component and a data component is disclosed. An apparatus and computer program product also perform the functions of the method. A method, in one embodiment, includes making a copy of the data set. The method, in certain embodiments, includes removing personal information from the data component, and modifying an index component key value with a random value, and modifying a data component key value with the same random value. The method, in a further embodiment, maintains a data set structure of the index component and the data component.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
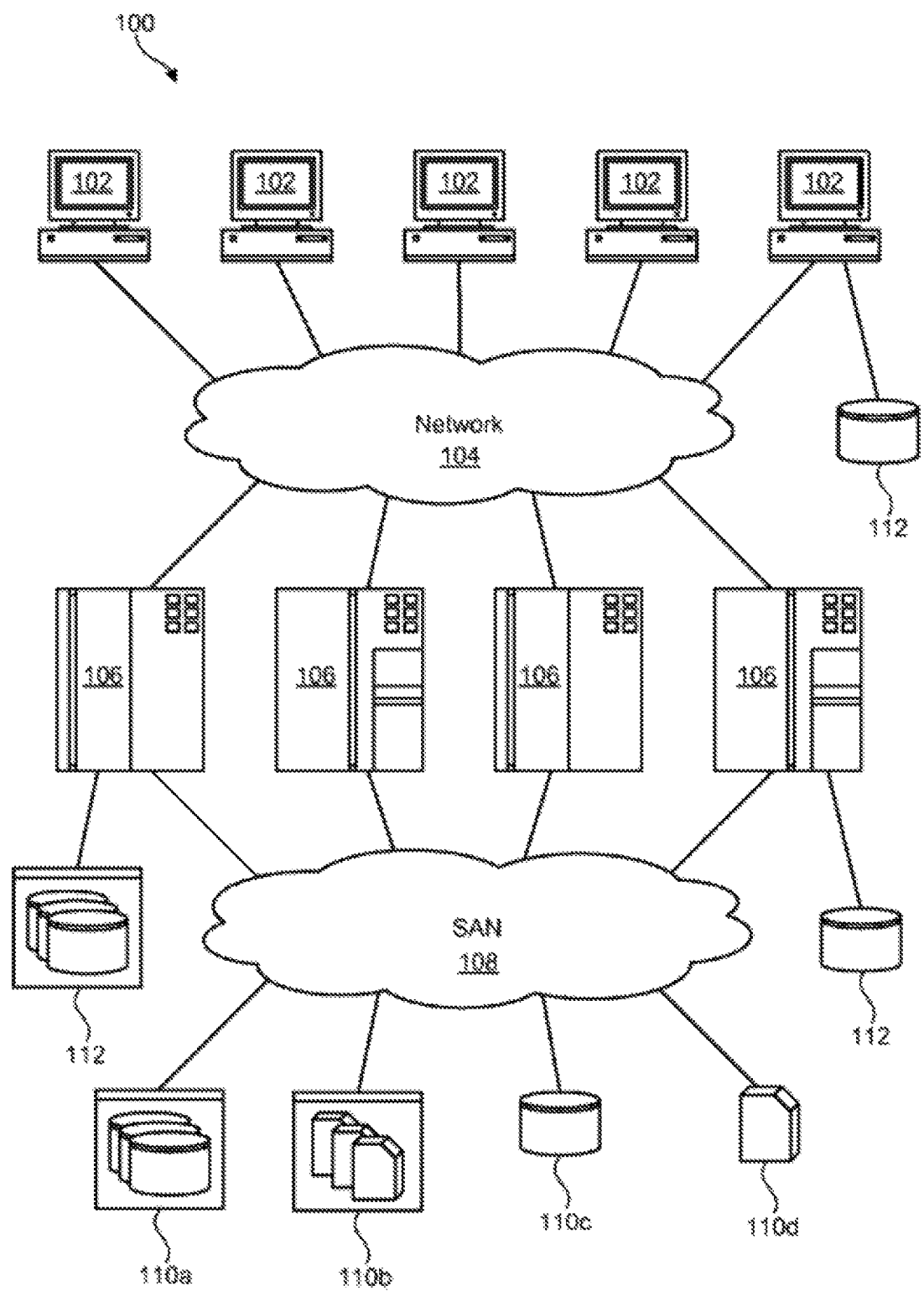
FIG. 1 is a schematic block diagram illustrating one example of a network architecture in accordance with the disclosed embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one example of a network architecture 100 in accordance with the disclosed embodiments. The network architecture 100 is presented to show one example of an environment where systems and methods in accordance with the disclosure may be implemented. The network architecture 100 is presented only by way of example and not limitation. Indeed, the systems and methods disclosed herein may be applicable to a wide variety of network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). In certain embodiments, storage systems 110 include server-like capabilities, and the servers 106 initiate communication sessions with the storage systems 110. In this sense, the servers 106 function as both a client and a server. These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
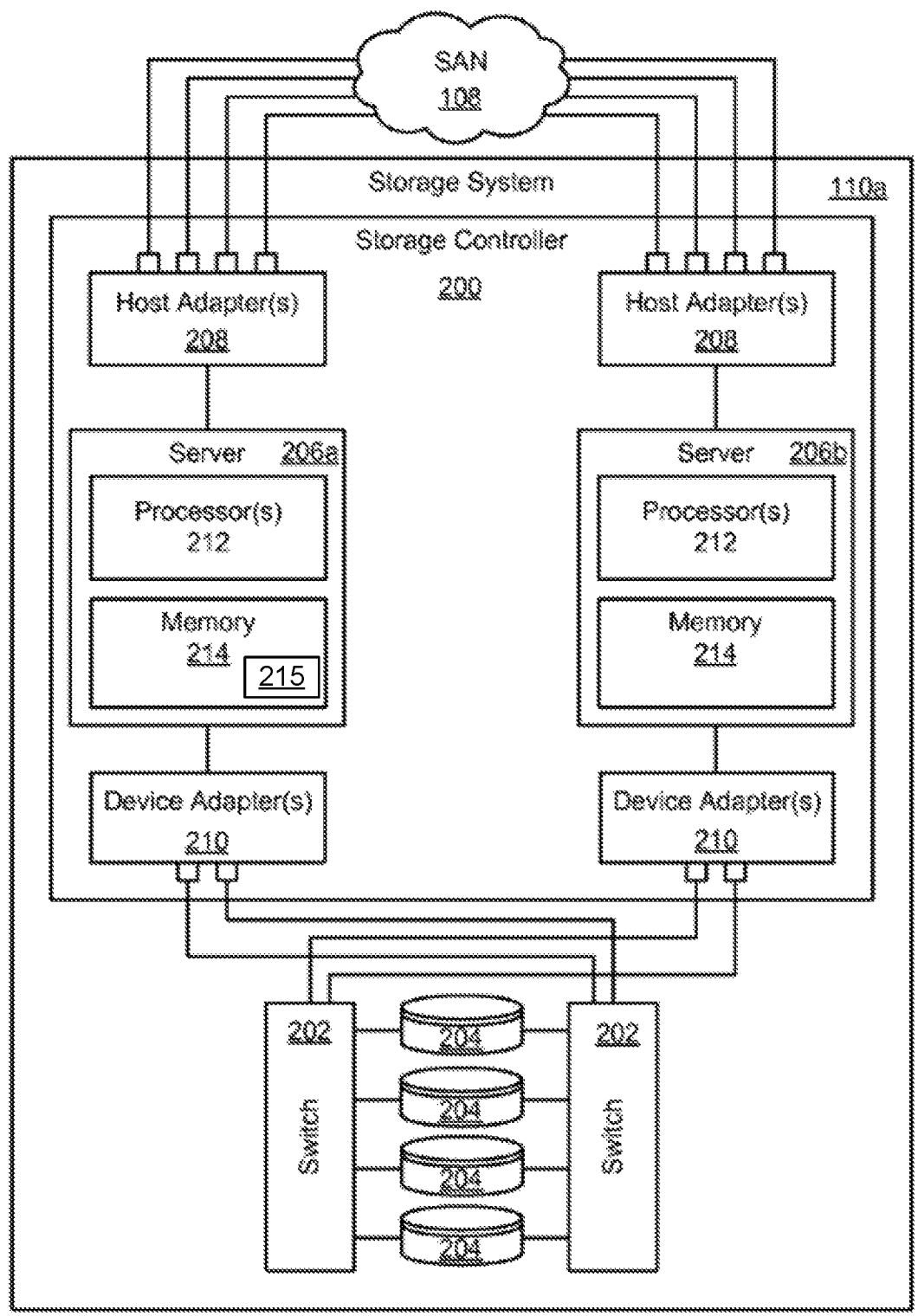
FIG. 2 is a schematic block diagram illustrating one embodiment of a storage system containing an array of hard-disk drives and/or solid-state drives in accordance with embodiments of the present disclosure.

FIG. 2 is a schematic block diagram illustrating one embodiment of a storage system 110a containing an array of hard-disk drives 204 and/or solid-state drives 204 in accordance with embodiments of the present disclosure. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106 running operating systems such as MVS, z/OS, or the like) to access data in the one or more storage devices 204.

In certain embodiments, the storage controller 200 includes one or more servers 206a,b. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the apparatus and methods disclosed herein are not limited to operation with the IBM DS8000™ enterprise storage system 110a, but may operate with any comparable or analogous storage system, regardless of the manufacturer, product name, or components or component names associated with the system 110a. Furthermore, any storage system that could benefit from one or more embodiments of the disclosure is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206a,b may host at least one instance of these software modules. These software modules may manage all read and write requests to logical volumes in the storage devices 204.

In selected embodiments, the storage controller 200 includes an anonymizer 215 that is adapted to anonymize key-sequenced data sets residing in the storage devices. The anonymizer 215, as described above may be implemented as a hardware circuit residing within the storage controller 200, etc., or alternatively may be implemented as software instructions residing in memory 214 and configured to be executed by one or more processors 212.

Figure 3:
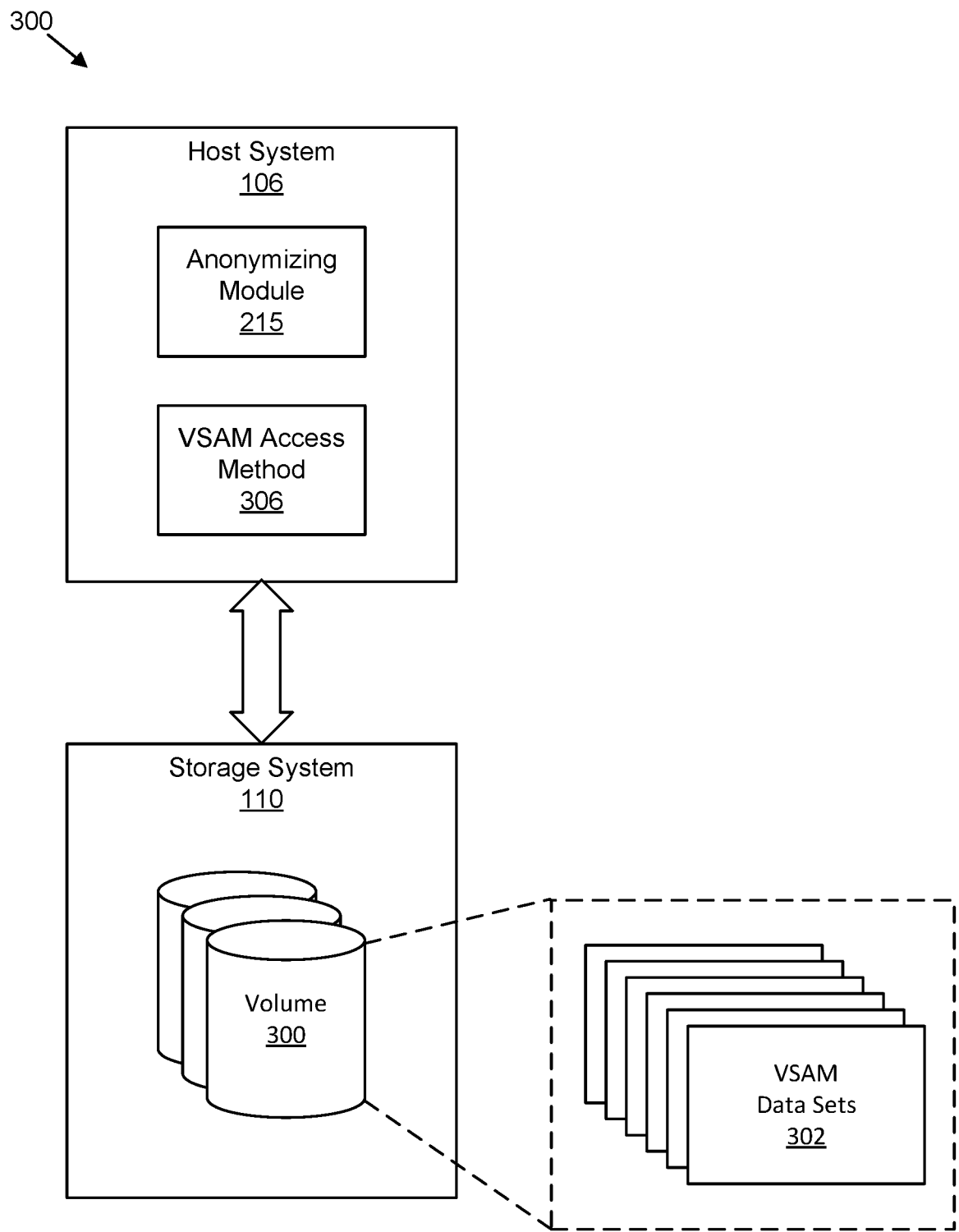
FIG. 3 is a schematic block diagram illustrating a simplified embodiment of the storage system including one or more logical volumes, storing one or more VSAM data sets, in accordance with embodiments of the present disclosure.

FIG. 3 is a schematic block diagram illustrating a simplified embodiment of the storage system 110a including one or more logical volumes 300, storing one or more VSAM data sets 302, in accordance with embodiments of the present disclosure. In the depicted embodiment, the anonymizer 215 is configured to operate within the host system 106, instead of the storage controller 200 as described above with reference to FIG. 2.

Figure 4:
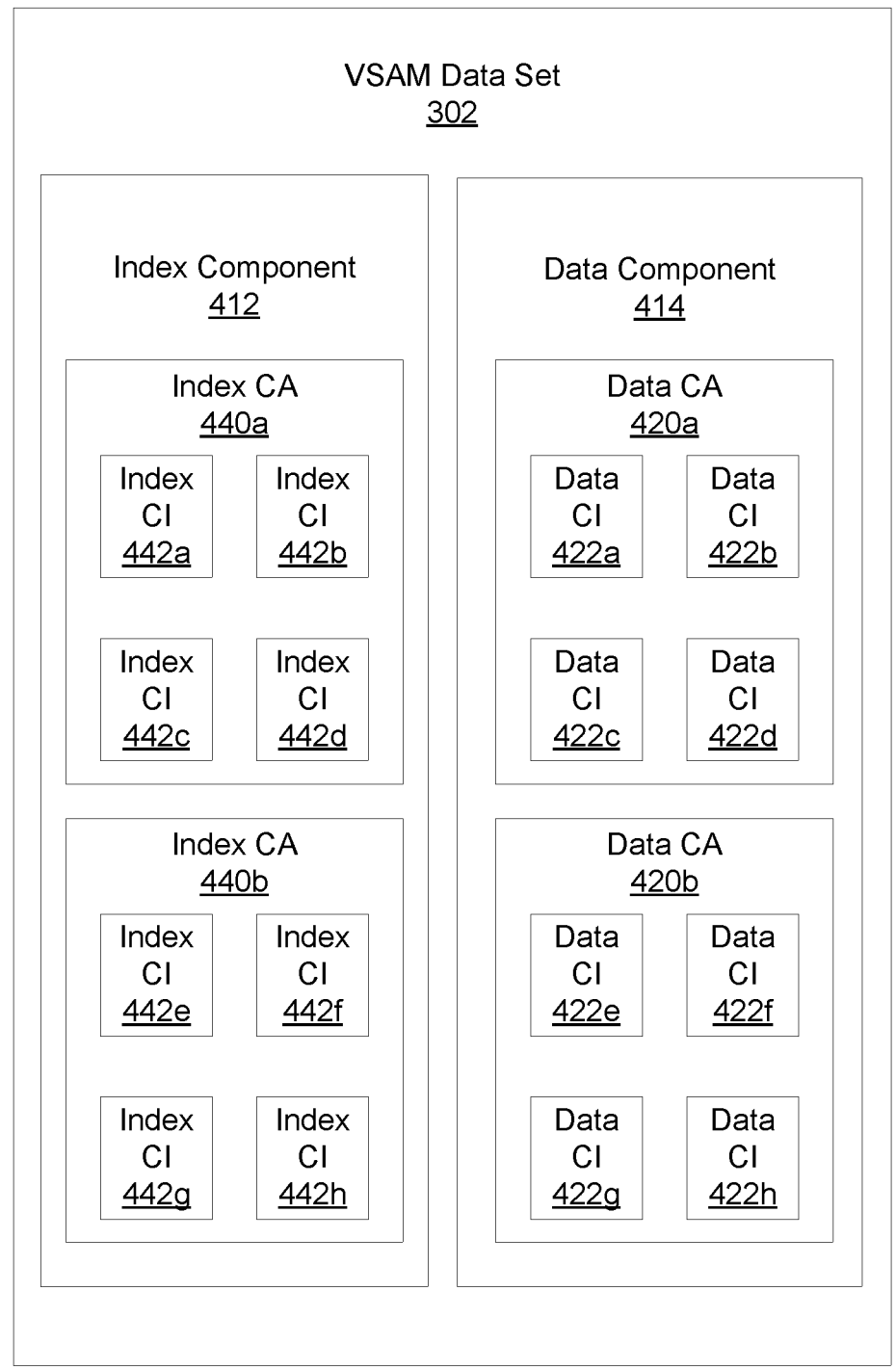
FIG. 4 is a schematic block diagram illustrating one embodiment of a VSAM data set in accordance with embodiments of the present disclosure.

FIG. 4 is a schematic block diagram illustrating one embodiment of a VSAM data set 302 in accordance with embodiments of the present disclosure. Other types of data sets may also benefit from being anonymized, and the present disclosure is not limited to a particular type of data set, although a VSAM data set is used as an example in this disclosure. Stated differently, any type of data set that includes an index component and a data component may benefit from the systems and methods of the present disclosure.

VSAM is a disk file storage access method commonly used with the IBM z/OS operating system. VSAM supports different data set organizations: Key Sequenced Data Set (KSDS), Relative Record Data Set (RRDS), Variable-length Relative Record Data Set (VRRDS), Entry Sequenced Data Set (ESDS), Hierarchical File System (RFS), and Linear Data Set (LDS). Certain types of VSAM data sets 302 have components, which are individual parts of the VSAM data set 302. The two types of VSAM components are the index component 412 and the data component 414. For example, KSDS and VRRDS VSAM data sets 302 have index components 412 and data components 414, while ESDS, RRDS, and LDS VSAM data sets 302 only have data components 414. The components may be multi-extent and/or multi-volume.

VSAM records are generally organized in fixed-size blocks called control intervals (CI). A CI is a contiguous area of direct access storage that VSAM uses to store data records and control information that describes the records. A CI generally includes logical records, free space for new logical records to be inserted into, and control information. A CI is the unit of information that VSAM transfers between a storage device and a host.

CIs are organized into control areas (CAs). A CA includes two or more CIs put together into fixed-length contiguous areas of storage 130. The example in FIG. 4 shows the data component 414 comprising data CIs 422a-d organized in data CA 420a, and data CIs 422e-h organized in data CA 420b. Index component 412 includes Index CA 440a and Index CA 440bb with Index CIs 442a-d and 442e-h respectively. A VSAM data set 302 is composed of one or more CAs.

In a VSAM data set 302, the index component key value (stored in the index component 412) of a record determines the record's position in the data component 414 of the VSAM data set 302. Thus, when a record is inserted into a CI, the record is placed in the correct sequential order relative to other records. The index component 412 allows the VSAM to randomly retrieve a record from the data component 414 when a request is made for a record with a particular index component key value. Additional information on VSAM data sets, CI splits, and CA splits can be found in the IBM redbook by Dave Lovelance, Rama Ayyar, Alvaro Sala, and Valeria Sokal, titled *VSAM Demystified*, (September 2003, 2d Ed), which is incorporated by reference in its entirety.

Figure 5:
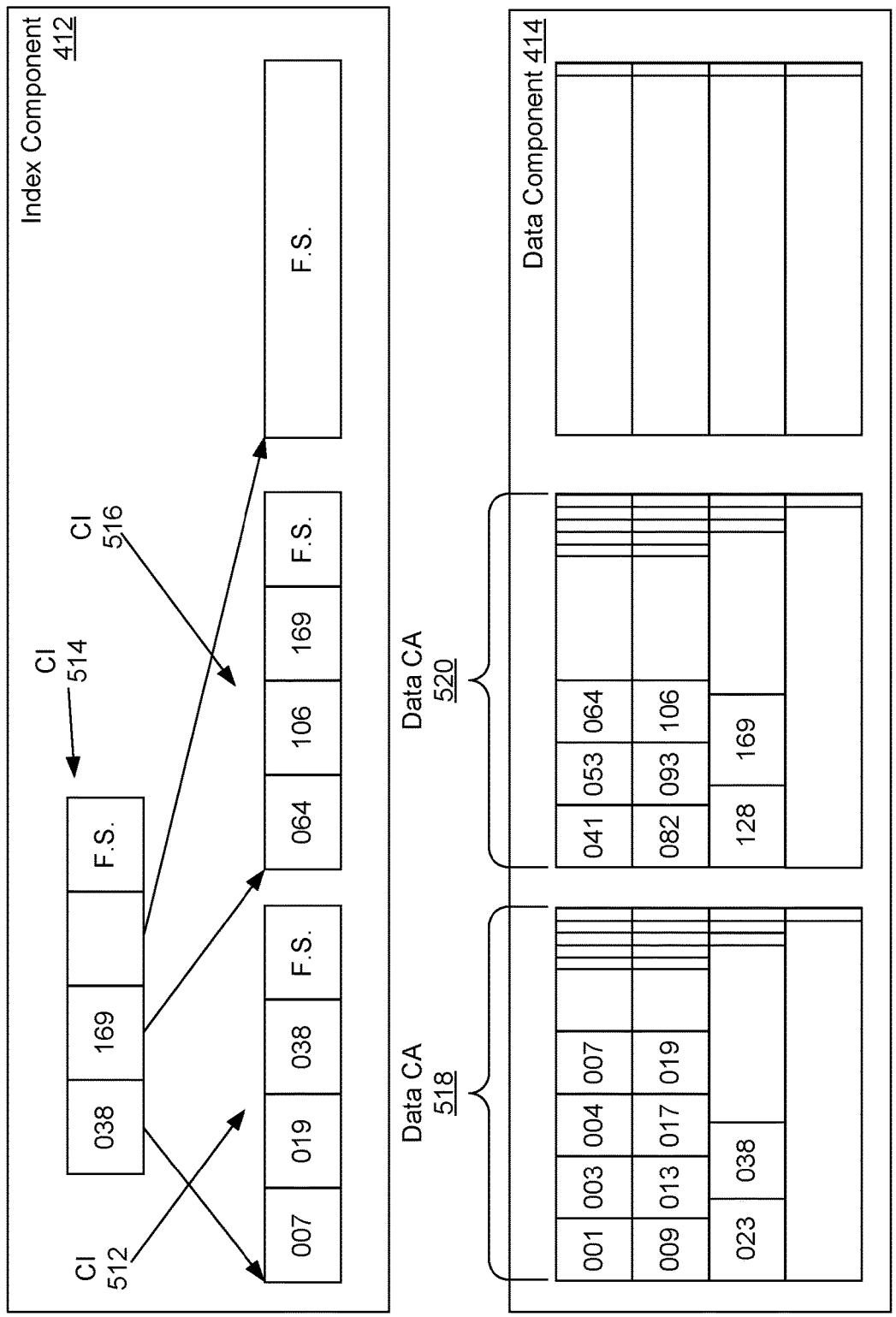
FIG. 5 is a schematic block diagram illustrating one embodiment of an index component and a data component in accordance with embodiments of the present disclosure.

FIG. 5 is a schematic block diagram illustrating one embodiment of an index component 412 and a data component 414 in accordance with embodiments of the present disclosure. As described above, a key-sequenced data set may include the index component 412 and the data component 414. The data set represents a logical data structure that interacts with a file system. The file system can employ an access method to organize the data. For example, the access method can be VSAM using the key-sequenced data set exemplified in FIG. 5. The data set depicts the index component 412 containing one or more index control intervals 512, 514, 516. The two data control areas 518, 520 of the data component 414 are already filled with control intervals in the depicted embodiment. The index component 412 shows two index control intervals in the index sequence set, which is the lower level of the index component.

To illustrate a basic operation of the data set, the following example can be used. If an application searches for a data record with key equal to 093, the applicant reads the top index control interval record 514. The value 093 is larger than 038, but is smaller than 169, thus the application knows that the key is not located in the control interval 512. The index record 514 that shows key 169 has a relative byte address (RBA) in index control interval 516 in the lower sequence set. The index control interval 516 is read. The value 093 is larger than 064, but it is smaller than 106. The application then knows that the index record 516 shows key 106 has the RBA of a data control interval 520 in the data component. The data control interval 520 may be read by the application. The value 093 is larger than 082, and so the data record 093 is found.

For simplicity, the key in the above example contained three digits. In other embodiments, the key may be from one byte in length to 255 bytes. The value of the key field (i.e., in the depicted embodiment "038" for example) should be unique. For this reason, often times a person setting up a key-sequenced data set might choose a part of a record that will result in a unique key. For example, in a data set containing bank records, the key may be the social security number of a bank customer, or some other confidential/personal information (e.g., bank account number).

When a service provider (e.g., bank, hospital, etc.) has a problem with a key-sequenced or -indexed data set, and analysis needs to be performed on the data set, it is necessary to sanitize or anonymize the data set of any confidential information. Both the data component 414 and the index component 412 should be anonymized while maintaining a link between corresponding keys and data records. Beneficially, the embodiments of the present disclosure, as will be described below in greater detail, include the anonymizing module that is configured to remove personal or confidential information from both the index component 412 and the data component 414 while maintaining the capability of the keys in the index to identify the location (e.g., relative byte address) of their corresponding data records in the data component 414.

Figure 6:
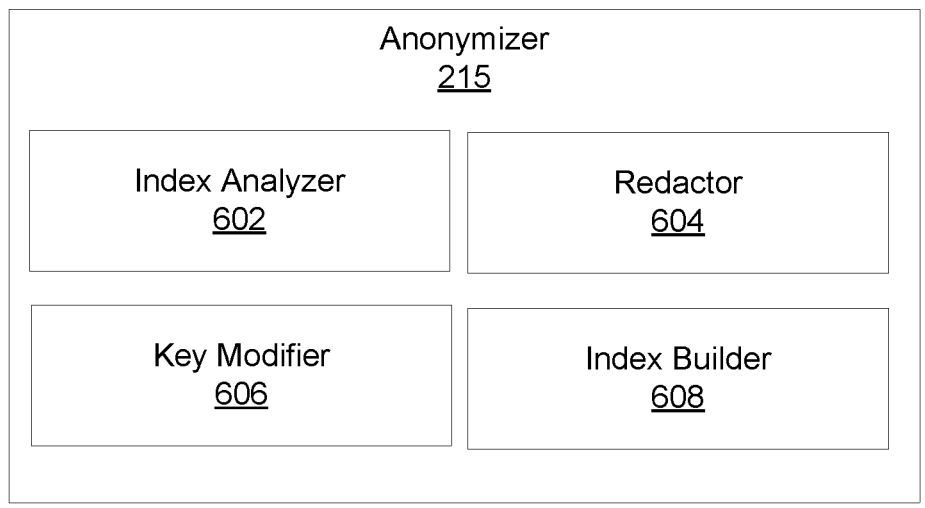
FIG. 6 is a schematic block diagram illustrating one embodiment of the anonymizer in accordance with the described embodiments

FIG. 6 is a schematic block diagram illustrating one embodiment of the anonymizer 215 in accordance with the described embodiments. As discussed above, with reference to FIG. 2, the anonymizer 215 is configured to analyze a data set that includes an index component and a data component and remove any personal information in either the index component or the data component while maintaining the data set structure (i.e., maintaining the pointers that link individual keys in the index component with their corresponding records in the data component). This beneficially improves the efficiency of a computing system by maintaining an anonymized data structure that does not require re-indexing which is processor intensive. The anonymizer, in certain embodiments, includes an index analyzer 602, a redactor 604, a key modifier 606, and an index builder 608.

In certain embodiments, the index analyzer 602 may be configured to analyze the index component (e.g., index component 412 of FIGS. 4 and 5). The index analyzer 602 may be configured to analyze all of the keys in the index component and identify a highest key value (e.g., maximum index component key value) of all of the keys. The index analyzer 602 is also configured to determine the highest possible key value (e.g., maximum possible index component key value). For example, in a set of numeric keys having possible values ranging from 0000 to 9999, the index analyzer 602 analyzes all of the keys and maintains a record of the key with the highest or greatest value, and also maintains the highest possible key value (e.g., 9999). Although this example illustrates keys with numeric values, alphanumeric or only alphabetic keys are contemplated.

The index analyzer 602, in certain embodiments, also examines the index component to determine if a fixed key length has been specified. The index analyzer 602 identifies whether, during a key-modification operation, the key modification will render certain key values to have a length that is greater than the specified key length. For example, using the same example as above, if the key has a maximum size of four digits (e.g., 0000 to 9999), and a key modification operation such as adding a random number to the key would increase the size of the key above four digits (e.g., adding 3527 to 8000), the index analyzer 602 is configured to identify such a condition and pass the information to the key modifier 606. Key modification operations will be discussed in greater detail below with reference to the key modifier 606.

In certain embodiments, the redactor 604 may be configured to erase personal or confidential information from records in the data component. The redactor 604, in one example, may be configured to overwrite personal information with zeros, or in alternative embodiments, with any random or pseudorandom data. The redactor 604 may be configured to identify personal information in a record of the data component by using pattern matching algorithms. Alternatively, a user may indicate to the redactor 604 with fields within a record contain personal information, and the redactor 604 erases those fields. In yet another example, the redactor 604 may be configured to erase all fields in a record.

In certain embodiments, the redactor 604 may be configured to not erase a field in a record of the data component that is being used as a key in the index component. Continuing the example of FIG. 5, the redactor 604 may be configured to identify that a field in the record contains the value 093, which is known by the index analyzer 602 to be a key value in the index component, and not redact or erase the value 093. In certain embodiments, the redactor 604 may be configured to erase every field of a record in the data component except the field that is being used as a key in the index component. In other words, analysis of a problematic data set, in some situations, is not reliant on the actual data in the data set (i.e., the index component and the data component). Instead, analysis of problematic data sets often focuses on broken pointers between the keys in the index component and the corresponding records in the data component. Erasing all of the fields of a data record, except for the field that contains the value used as a key in the index component, does not affect the ability to identify problems with the data set and the source of the problem (e.g., operating system code that, when executed by a processor, mishandled the data set).

The key modifier 606, in certain embodiments, may be configured to modify or anonymize a key value in the index component and its corresponding data component value in the data component. The key modifier 606 may be configured to generate a modifier and perform a key modification operation using the modifier. In certain embodiments, the modifier may be a random or pseudorandom number that is then, for example, added to or subtracted from the key value and data component value. In one simple example, if the key/data component value is 4781 and the modifier is 3371, the resulting modified value of adding the two together would be 8152.

In certain embodiments, the key modifier 606 may be configured to detect if a modified value contains any zero values (e.g., 8052), and to modify the zero value to contain a non-zero value. The key modifier 606 is configured, in this example, to modify both the key value in the index component and the corresponding data value in the data component. The key modifier 606 may also be configured to generate a single random value to be applied to every key in the data set, or alternatively, generate a new random modifier value for each key.

As described briefly above, in certain situations adding the random modifier value to a key value of the index component may increase the length of the key value beyond maximum key length as determined by the index analyzer 602. The key modifier 606 may be configured to increase the maximum key length to accommodate the modified key values. For example, the key modifier 606 may be configured to increase the maximum key length by 1 byte if there is sufficient space in the index component to accommodate the extra length. The key modifier 606 may also be configured to decrease, if there is not sufficient space in the index component, a key start location by 1 byte so that a modified key value overwrites the one byte of data before the key value's original location in the index component. The key modifier 606, in certain embodiments, may be configured to discard the modifier value once all keys in the index component and the data component have been modified to ensure that the original data is not recoverable.

In certain embodiments, the index builder 608 may be configured to generate a new index component based on the modified key values of the data component. This will allow a data set that may be accessed as a KSDS. However, in certain embodiments it is beneficial to analyze the data set with the anonymized personal or confidential information because the original structure of the index component and data component is maintained with all personal or confidential information removed.

Figure 7:
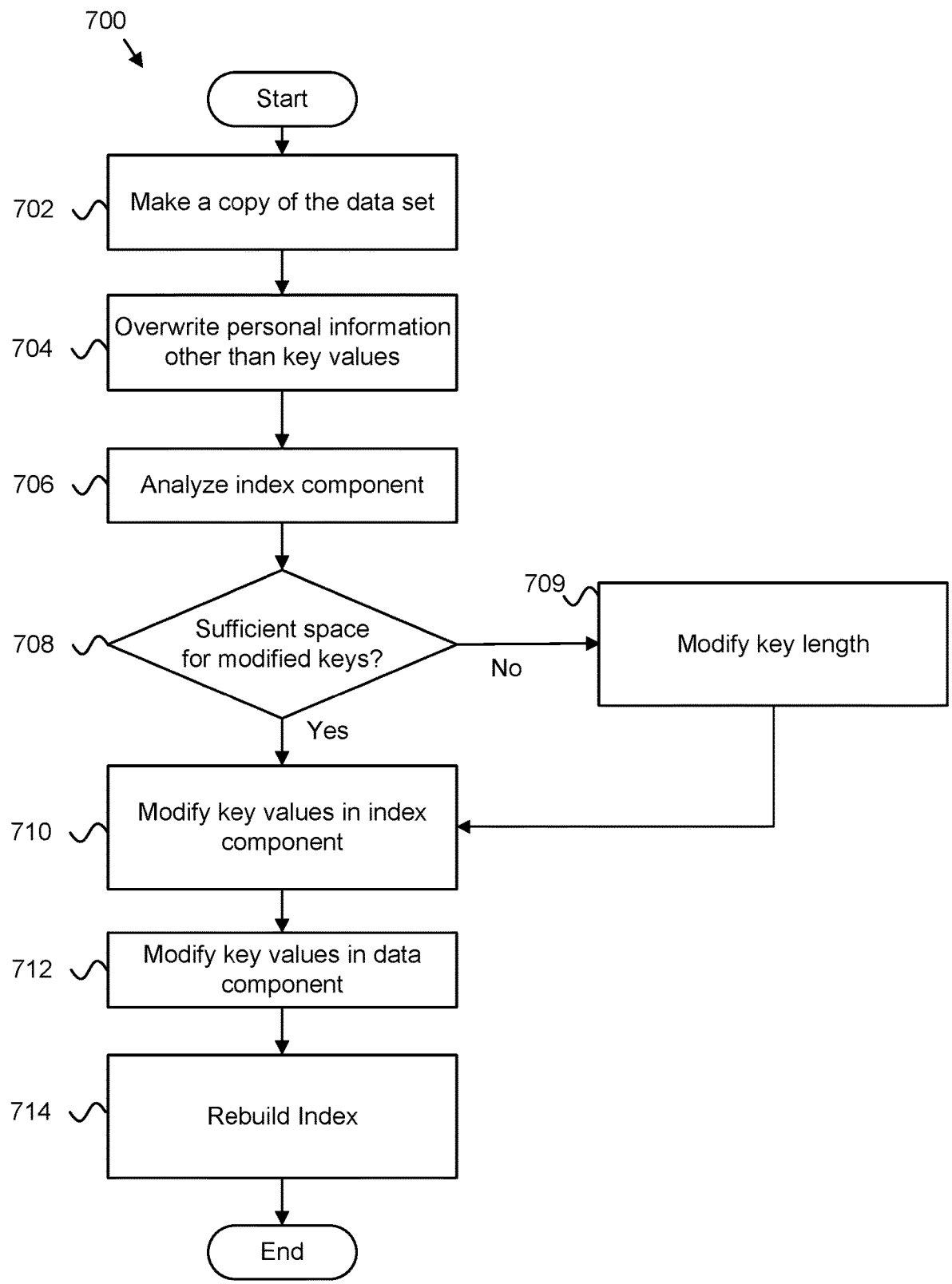
FIG. 7 is a schematic flow chart diagram illustrating one embodiment of a method for anonymizing personal information in a key-sequenced data set in accordance with embodiments of the present disclosure.

FIG. 7 is a schematic flow chart diagram illustrating one embodiment of a method 700 for anonymizing personal information in a key-sequenced data set in accordance with embodiments of the present disclosure. In one embodiment, the method 700 starts and the storage controller, for example, receives a request from a host that a user wants to anonymize and analyze a data set residing on a storage volume (e.g., volume 300 of FIG. 3). The storage controller makes 702 a copy of the data set. In certain embodiments, making a copy of the data set may involve invoking a FlashCopy command to create a track for track copy of the data set (see *VSAM Demystified* by Dave Lovelance, Rama Ayyar, Alvaro Sala, and Valeria Sokal, September 2003, 2d Ed). FlashCopy, as known to those of skill in the art, replicates the data set and maintains the structure of the index component and the data component, including any errors (e.g., broken or missing pointers).

The method continues and the redactor 604 erases any personal information in a record in the data component that does not correspond to a key value in the index. Stated differently, the redactor 604 erases or overwrites 704 any information that is not a key value. In certain embodiments, overwriting 704 personal or confidential information may include writing zeros over values in the records.

In certain embodiments, the method continues and the index analyzer 602 analyzes 706 the index component. As described above, the index analyzer 602 analyzes all of the keys in the index component and identifies a highest key value of all of the keys. The index analyzer 602 also determines the highest possible key value. The index analyzer 602 also examines the index component to determine if a fixed key length has been specified and if a key modification operation is going to render any of the key values to have a length that is greater than the specified key length, or if there is sufficient space for modified key values. If the decision is yes, the method continues. Alternatively, the key modifier 606 modifies 709 the key length as described above.

In certain embodiments the method 700 continues and the key modifier 606 modifies 710 the key values in the index component. The key modifier 606, as described above, generates a modifier value and applies the modifier value to the key values. In certain embodiments, applying a modifier value to key values may include adding, subtracting, multiplying, dividing, or some other mathematical operation. Additionally, the key modifier 606 detects if a modified key value contains any zero digits, and if so, the key modifier 606 generates a new random or pseudorandom digit to replace the zero value. The key modifier 606 then modifies 712 the key values in the data component with the same modifier so that the key value in the index component and the key value in the data component remain synced. At this point all of the personal information in the data set has been erased or modified with random values. The method 700 continues, and the index builder 608 rebuilds 714 the index if requested by the host/user based on the modified key values. The method 700 then ends.

Figure 8:
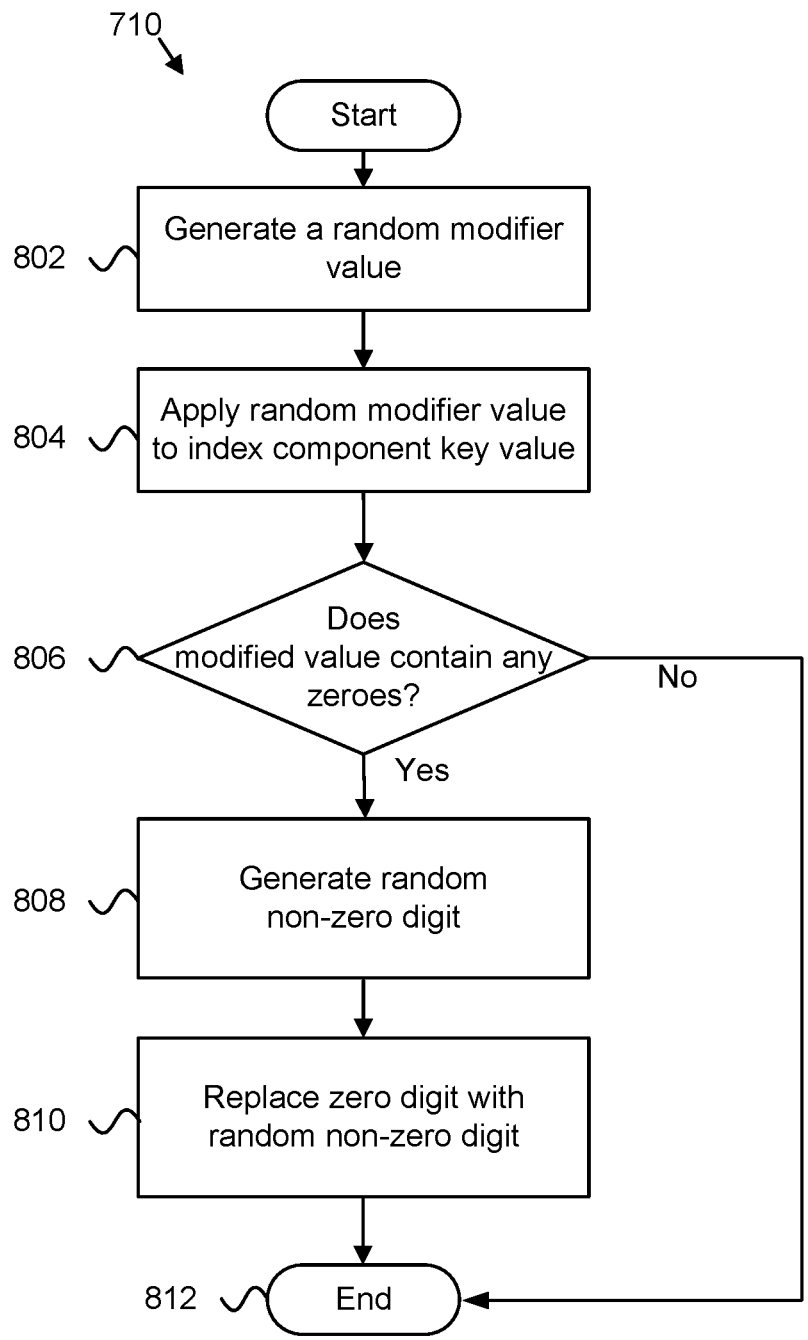
FIG. 8 is a schematic flowchart diagram illustrating one embodiment of a method for modifying an index component key value in accordance with embodiments of the present disclosure.

FIG. 8 is a schematic flowchart diagram illustrating one embodiment of a method 800 for modifying an index component key value in accordance with embodiments of the present disclosure. As discussed above, the key modifier (e.g., key modifier 606 of FIG. 6) replaces an index component key value, which may contain personal information, with a modified key value. This same key value also replaces the data component key value. In certain embodiments, the method 710 starts and the key modifier generates 802 a random modifier value which is then applied 804 to the index component key value to create a modified key value.

The method 710 continues, and the key modifier analyzes the modified key value to determine 806 if the modified key value contains any digits with zero values. If the determination is no, the method 710 ends. Otherwise, the key modifier generates 808 a random, non-zero digit and replaces 810 the zero digit with the random non-zero digit. In certain embodiments, the key modifier may instead generate a new random modifier value to apply to the entire index component key value instead of replacing a single zero-value digit. In yet other embodiments, the key modifier may generate a random modifier value for each index component key value. After a satisfactory modified value is created, the key modifier may also modify the corresponding data component key value, and the method 710 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a computer-readable storage media storing code executable by the processor to perform the steps of:
making a copy of a data set having an index component and a data component that define a data structure;
removing personal information from the data component other than a data component key value;
modifying an index component key value with a random value, and modifying the data component key value with the same random value; and
maintaining, in response to the modifying, the data set structure of the index component and the data component.

2. The apparatus of claim 1, where the steps further comprise analyzing the index component and identifying a maximum key value of a set of index component key values.

3. The apparatus of claim 2, where analyzing the index component further comprises identifying a maximum possible index component key value.

4. The apparatus of claim 3, where analyzing the index component further comprises determining if modifying the index component key value with the random value results in a new index component key value that is larger than the maximum possible index component key value.

5. The apparatus of claim 4, where analyzing the index component further comprises, in response to a determination that the new index component key value is larger than the maximum possible index component key value, modifying a key length of the index component.

6. The apparatus of claim 1, where removing personal information from the data component further comprises overwriting the personal information with zeroes.

7. The apparatus of claim 1, where modifying the index component key value further comprises identifying if a modified index component key value contains a zero digit.

8. The apparatus of claim 7, where identifying if a modified index component key value contains a zero digit further comprises generating a new, non-zero, random digit and replacing the zero digit with the new, non-zero, random digit.

9. A method for anonymizing an index component and a corresponding data component, the method comprising:
making, by use of a processor, a copy of a data set having an index component and a data component that define a data structure;
removing personal information from the data component other than a data component key value;
modifying an index component key value with a random value, and modifying the data component key value with the same random value; and
maintaining, in response to the modifying, the data set structure of the index component and the data component.

10. The method of claim 9, further comprising analyzing the index component and identifying a maximum key value of a set of index component key values.

11. The method of claim 10, where analyzing the index component further comprises identifying a maximum possible index component key value.

12. The method of claim 11, where analyzing the index component further comprises determining if modifying the index component key value with the random value results in a new index component key value that is larger than the maximum possible index component key value.

13. The method of claim 12, where analyzing the index component further comprises, in response to a determination that the new index component key value is larger than the maximum possible index component key value, modifying a key length of the index component.

14. The method of claim 9, where removing personal information from the data component further comprises overwriting the personal information with zeroes.

15. The method of claim 9, where modifying the index component key value further comprises identifying if a modified index component key value contains a zero digit.

16. The method of claim 15, where identifying if a modified index component key value contains a zero digit further comprises generating a new, non-zero, random digit and replacing the zero digit with the new, non-zero, random digit.

17. A computer program product comprising a computer-readable storage medium having program instructions embodied therewith, the program instructions readable/executable by a processor to cause the processor to perform the steps of:

making a copy of a data set having an index component and a data component that define a data structure;

removing personal information from the data component other than a data component key value;

modifying an index component key value with a random value, and modifying the data component key value with the same random value; and maintaining, in response to the modifying, the data set structure of the index component and the data component.

18. The computer program product of claim 17, where the steps further comprise analyzing the index component and identifying a maximum key value of a set of index component key values.

19. The computer program product of claim 18, where analyzing the index component further comprises identifying a maximum possible index component key value.

20. The computer program product of claim 19, where analyzing the index component further comprises determining if modifying the index component key value with the random value results in a new index component key value that is larger than the maximum possible index component key value.

* * * * *